United States Patent
Zhou et al.

(10) Patent No.: US 12,339,456 B2
(45) Date of Patent: Jun. 24, 2025

(54) NEAR-EYE DISPLAY APPARATUS

(71) Applicant: BOE Technology Group Co., Ltd., Beijing (CN)

(72) Inventors: Zhenxing Zhou, Beijing (CN); Tao Hong, Beijing (CN); Gaoming Sun, Beijing (CN); Chengfu Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/292,272

(22) PCT Filed: Nov. 23, 2021

(86) PCT No.: PCT/CN2021/132434
§ 371 (c)(1),
(2) Date: Jan. 25, 2024

(87) PCT Pub. No.: WO2023/092279
PCT Pub. Date: Jun. 1, 2023

(65) Prior Publication Data
US 2024/0377635 A1    Nov. 14, 2024

(51) Int. Cl.
*G02B 27/01*    (2006.01)

(52) U.S. Cl.
CPC ..... *G02B 27/0172* (2013.01); *G02B 27/0176* (2013.01)

(58) Field of Classification Search
None
See application file for complete search history.

(56) References Cited

U.S. PATENT DOCUMENTS

| | | | |
|---|---|---|---|
| 6,008,778 A | 12/1999 | Takahashi et al. | |
| 2016/0085074 A1 | 3/2016 | Cheng et al. | |
| 2019/0271847 A1 | 9/2019 | Cheng et al. | |
| 2020/0233189 A1* | 7/2020 | Smith | G02B 27/0172 |
| 2021/0181555 A1 | 6/2021 | Ma et al. | |
| 2022/0171191 A1 | 6/2022 | Ha | |

FOREIGN PATENT DOCUMENTS

| | | |
|---|---|---|
| CN | 102782562 A | 11/2012 |
| CN | 110967832 A | 4/2020 |
| CN | 111308710 A | 6/2020 |
| JP | H09331552 A | 12/1997 |
| JP | 2000105349 A | 4/2000 |
| KR | 20200113725 A | 10/2020 |

OTHER PUBLICATIONS

PCT/CN2021/132434 international search report dated May 9, 2022.

* cited by examiner

*Primary Examiner* — Ifedayo B Iluyomade
(74) *Attorney, Agent, or Firm* — IPro, PLLC (57) ABSTRACT

A near-eye display device is disclosed. The near-eye display device includes: a plurality of display screens for image display; the plurality of display screens at least including: a first display screen, a second display screen and a third display screen; and an imaging lens group configured to image displayed images of the display screens; the imaging lens group including at least: a first lens and a second lens; where the first lens and the second lens are both on a light-emitting side of the first display screen, and the second lens is on a side of the first lens away from the first display screen; the second display screen and the third display screen are on a side of the first lens away from the first display screen.

13 Claims, 3 Drawing Sheets

NEAR-EYE DISPLAY APPARATUS

This application is a National Stage of International Application No. PCT/CN2021/132434, filed on Nov. 23, 2021, which is hereby incorporated by reference in its entirety.

TECHNICAL FIELD

The present disclosure relates to the field of display technology, and in particular to a near-eye display device.

BACKGROUND

In recent years, with the continuous development of technology of virtual reality (VR) and augmented reality (AR), near-eye display products are initially used in the military field, and gradually widely used in the civil fields, such as film and television, education, medical care, etc. The VR display device has advantages of immersion, interaction and imagination; the AR display device can realize fusion of the real scene outside and the virtual scene by superimposing the displayed virtual scene image on the real scene outside, and thus can improve the user's cognitive ability to the real world.

In current VR devices, since one eye can only correspond to one screen (or two eyes share the same screen), the display resolution that human eyes can see depends on the resolution of a single screen. Therefore, when the resolution of the screen is low, there will be obvious gaps between pixels of the image seen by the human eyes, that is, the screen door effect. Improving the resolution of the screen is an important way to solve the screen door effect, but limited by the current screen manufacturing technology and cost, and high defect rate and cost of high-resolution screens, so it is difficult to greatly improve the resolution of the screen.

SUMMARY

An embodiment of the present disclosure provides a near-eye display device, including:
- a plurality of display screens for image display; the plurality of display screens at least including: a first display screen, a second display screen and a third display screen; and
- an imaging lens group configured to image displayed images of the display screens; the imaging lens group including at least: a first lens and a second lens;
- where the first lens and the second lens are both on a light-emitting side of the first display screen, and the second lens is on a side of the first lens away from the first display screen; the second display screen and the third display screen are on a side of the first lens away from the first display screen;
- the first lens includes: a first surface facing the first display screen and a second surface away from the first display screen; the first surface is configured to transmit outgoing light of the first display screen; the second surface is configured to transmit the outgoing light of the first display screen and reflect outgoing light of the second display screen and outgoing light of the third display screen.

In some embodiments of the present disclosure, the second display screen and the third display screen are arranged symmetrically with respect to the first display screen.

In some embodiments of the present disclosure, the second display screen and the third display screen are arranged symmetrically with respect to the first display screen along a horizontal direction of a field of view of a human eye; or the second display screen and the third display screen are arranged symmetrically with respect to the first display screen along a vertical direction of a field of view of a human eye.

In some embodiments of the present disclosure, shapes and sizes of the first display screen, the second display screen and the third display screen are identical;
each of the first display screen, the second display screen and the third display screen is a rectangular display screen, and an aspect ratio of the rectangular display screen is 3:1; the first display screen, the second display screen and the third display screen are arranged in sequence along a width direction of the rectangular display screen.

In some embodiments of the present disclosure, an image resolution of the first display screen is greater than an image resolution of the second display screen and an image resolution of the third display screen.

In some embodiments of the present disclosure, the first display screen, the second display screen and the third display screen are liquid crystal display screens, organic light-emitting diode display screens or silicon-based display screens.

In some embodiments of the present disclosure, the second surface of the first lens includes: a first area located in a middle of the second surface, a second area and a third area respectively located on both sides of the first area, a fourth area located on a side of the second area away from the first area, and a fifth area located on a side of the third area away from the first area; the second display screen is arranged facing the second area and the fourth area, and the third display screen is arranged facing the third area and the fifth area;
where the first area is configured to transmit the outgoing light of the first display screen; the second area is configured to transmit the outgoing light of the first display screen and reflect the outgoing light of the second display screen; the fourth area is configured to reflect the outgoing light of the second display screen; the third area is configured to transmit the outgoing light of the first display screen and reflect outgoing light of the third display screen; the fifth area is configured to reflect the outgoing light of the third display screen.

In some embodiments of the present disclosure, display content of the first display screen incident on a display area corresponding to the second area is identical with display content of the second display screen incident on the display area corresponding to the second area; display content of the first display screen incident on a display area corresponding to the third area is identical with display content of the third display screen incident on the display area corresponding to the third area.

In some embodiments of the present disclosure, display brightness of the first display screen incident on the display area corresponding to the second area and the third area is greater than display brightness of other areas;
display brightness of the second display screen incident on the display area corresponding to the second area is greater than display brightness of other areas;
display brightness of the third display screen incident on the display area corresponding to the third area is greater than display brightness of other areas.

In some embodiments of the present disclosure, the second area, the third area, the fourth area and the fifth area are all partially reflective and partially transmissive areas;

a reflectance of each of the fourth area and the fifth area is greater than a reflectance of each of the second area and the third area.

In some embodiments of the present disclosure, the second area and the third area are partially reflective and partially transmissive areas; the fourth area and the fifth area are reflective areas.

In some embodiments of the present disclosure, surface shapes of the first lens and the second lens both adopt free-form surfaces.

In some embodiments of the present disclosure, the first lens includes an axisymmetric structure with respect to a position of an optical axis along a horizontal direction of a field of view of a human eye, and the first lens includes an axisymmetric structure with respect to a position of an optical axis along a vertical direction of the field of view of the human eye.

In some embodiments of the present disclosure, the near-eye display device further including:

a first lens group located between the first lens and the second lens; and/or a second lens group located between the first display screen and the first lens; and/or a third lens group located between the second display screen and the first lens; and/or a fourth lens group located between the third display screen and the first lens.

In some embodiments of the present disclosure, each of the first lens group, the second lens group, the third lens group and the fourth lens group includes at least one lens;

the lens adopts a spherical lens, an aspheric lens, a prism or a free-form surface lens.

BRIEF DESCRIPTION OF FIGURES

In order to more clearly illustrate technical solutions of embodiments of the present disclosure, the following will briefly introduce the accompanying drawings required in embodiments of the present disclosure. Obviously, the drawings described below are only some embodiments of the present disclosure. Those of ordinary skill in the art can also obtain other drawings based on these drawings without making creative efforts.

1—display screen, 2—imaging lens group, 3—first lens group, 4—second lens group, 5—third lens group, 6—fourth lens group, 11—first display screen, 12—second display screen, 13—third display screen, 21—first lens, 22—second lens.

DETAILED DESCRIPTION

In order to make the above objects, features and advantages of the present disclosure more comprehensible, the present disclosure will be further described below in conjunction with the accompanying drawings and embodiments. Example embodiments may, however, be embodied in many forms and should not be construed as limited to embodiments set forth herein; rather, these embodiments are provided so that this disclosure will be thorough and complete, and will fully convey the concept of example embodiments to those skilled in the art. The same reference numerals denote the same or similar structures in the drawings, and thus their repeated descriptions will be omitted. The words expressing positions and directions described in the present disclosure are all described by taking the accompanying drawings as examples, but changes can also be made as required, and all changes are included in the protection scope of the present disclosure. The drawings in the present disclosure are only used to illustrate relative positional relationships and do not represent true scales.

A near-eye display device refers to a display device worn on eyes of a user, for example, a near-eye display device is generally presented in the form of glasses or a helmet. In recent years, with the continuous development of virtual reality (referred to as VR) and augmented reality (referred to as AR), near-eye display products are initially used in the military field, and gradually widely used in civil fields, such as film and television, education, medical care, etc.

Here, the AR near-eye display technology is to superimpose the virtual image generated by the near-eye display device on the real-world image to display, so that users can see the final augmented real-world image on the screen. The VR near-eye display technology is to display images of left and right eyes on near-eye displays corresponding to the left and right eyes, and the left and right eyes can obtain the image information with differences and then synthesize stereoscopic vision in the brain.

The VR display device has the advantages of immersion, interactivity and imagination). The AR display device can realize fusion of the real scene outside and the virtual scene by superimposing the displayed virtual scene image on the real scene outside, and thus can improve the user's cognitive ability to the real world.

In current VR devices, since one eye can only correspond to one screen (or two eyes share the same screen), the display resolution that human eyes can see depends on the resolution of a single screen. Therefore, when the resolution of the screen is low, there will be obvious gaps between pixels of the image seen by the human eyes, that is, the screen door effect. Improving the resolution of the screen is an important way to solve the screen door effect, but limited by the current screen manufacturing technology and cost, and high defect rate and cost of high-resolution screens, so it is difficult to greatly improve the resolution of the screen.

Figure 1:
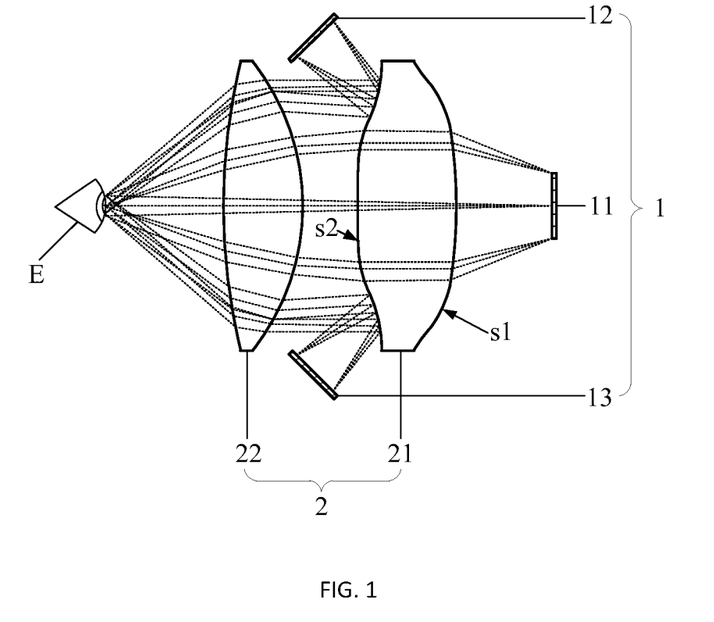
FIG. 1 is a first structural schematic diagram of a near-eye display device according to an embodiment of the present disclosure.

In view of this, an embodiment of the present disclosure provides a near-eye display device, and FIG. 1 is a first structural schematic diagram of a near-eye display device according to an embodiment of the present disclosure.

As shown in FIG. 1, the near-eye display device includes: a display screen 1 and an imaging lens group 2.

The display screen 1 is configured to display images.

The display screen 1 is used as an image source for displaying images. The near-eye display device may include two groups of display screens 1, which are respectively configured to display images for the left eye and images for the right eye, and then use independent imaging systems to image the displayed images of the two groups of display screens 1, so that the human eyes can see the images for the left and right eyes with certain parallax, which produces a stereoscopic display effect.

In an embodiment of the present disclosure, the display screen 1 may be one of a liquid crystal display screen, an organic light-emitting diode display screen or a silicon-based display screen, which is not limited here.

A liquid crystal display (LCD for short) is mainly composed of a backlight module and a liquid crystal display panel. The liquid crystal display panel itself does not emit light, and needs to rely on the light source provided by the backlight module to achieve brightness display. The imaging principle of the LCD is to place the liquid crystal between two pieces of conductive glass, driven by the electric field between two electrodes, causing the electric field effect of twisting the liquid crystal molecules, so as to control the transmission or shielding function of the backlight, so as to display the image. If color filters are added, color images may be displayed. The liquid crystal display technology is mature, and the liquid crystal display screen has lower cost and excellent performance.

The Organic Light-Emitting Diode (OLED for short) display is also called organic electro-laser display and organic light-emitting semiconductor display. The OLED display belongs to a current-type organic light-emitting device, which is a phenomenon of luminescence caused by injection and recombination of carriers, and the luminous intensity is proportional to the injected current. Under the action of an electric field in the OLED, holes generated by an anode and electrons generated by a cathode may move, are injected into a hole transport layer and an electron transport layer respectively, and migrated to a light-emitting layer. When the holes and the electrons meet in the light-emitting layer, energy excitons are generated, which excite light-emitting molecules and finally produce visible light. The OLED display is a self-luminous display, so it does not need to be equipped with a backlight module, and the overall thickness of the device is small, which is conducive to miniaturization of the near-eye display device and is more conducive to installation of the whole machine.

The silicon-based display screen is to manufacture driving components of the display screen on a silicon-based substrate. Using this process can improve the resolution of the display screen and improve the display effect of the near-eye display device. Current silicon-based display screens include silicon-based liquid crystal display screens and silicon-based OLED display screens, which are not limited here.

The imaging lens group 2 is located on a light-emitting side of the display screen 1 and is configured to image a displayed image of the display screen 1.

The size of the display screen 1 in the near-eye display device is relatively small, and the displayed image cannot be directly viewed by human eyes. Therefore, it is necessary to install an imaging lens group 2 on the light-emitting side of the display screen 1. After the display image is enlarged and imaged, the image is observed by human eyes.

Generally, the display screen 1 can be set within one focal length of the imaging lens group 2, so that the imaging lens group 2 can form a magnified upright virtual image on the same side of the display screen 1 for human eyes to watch.

In an embodiment of the present disclosure, the display screen 1 at least includes: a first display screen 11, a second display screen 12 and a third display screen 13. The imaging lens group 2 at least includes: a first lens 21 and a second lens.

Here, as shown in FIG. 1, the first lens 21 and the second lens 22 are both located on a light-emitting side of the first display screen 11, and the second lens 22 is located on a side of the first lens 21 away from the first display screen 11; the second display screen 12 and the third display screen 13 are located on a side of the first lens 21 away from the first display screen 11.

The first lens 21 includes: a first surface s1 facing the first display screen 11 and a second surface s2 away from the first display screen 11; the first surface s1 is configured to transmit outgoing light of the first display screen 11; the second surface s2 is configured to transmit the outgoing light of the first display screen 11 and reflect outgoing light of the second display screen 12 and the third display screen 13.

The imaging lens group 2 in an embodiment of the present disclosure adopts at least two lenses. Using only one lens as the imaging lens may increase the difficulty of lens design and make the field of view of the entire device smaller. Therefore, the imaging lens group 2 in an embodiment of the present disclosure adopts at least two lenses.

The first display screen 11 is located on a side of the imaging lens group 2 away from a human eye, and is arranged directly in front of the human eye. The image displayed on the first display screen 11 can be imaged using the traditional transmission imaging principle. The second display screen 12 and the third display screen 13 are both arranged on a side of the first lens 21 away from the first display screen 11, and the displayed images of the second display screen 12 and the third display screen 13 can first be incident on the first lens 21 for reflection and then enters the second lens 22 for imaging. Thus, image splicing can be performed through at least three display screens, the resolution requirement of each display screen can be relatively reduced, the cost can be reduced, and image display with higher image resolution can be realized through image splicing.

Figure 2:
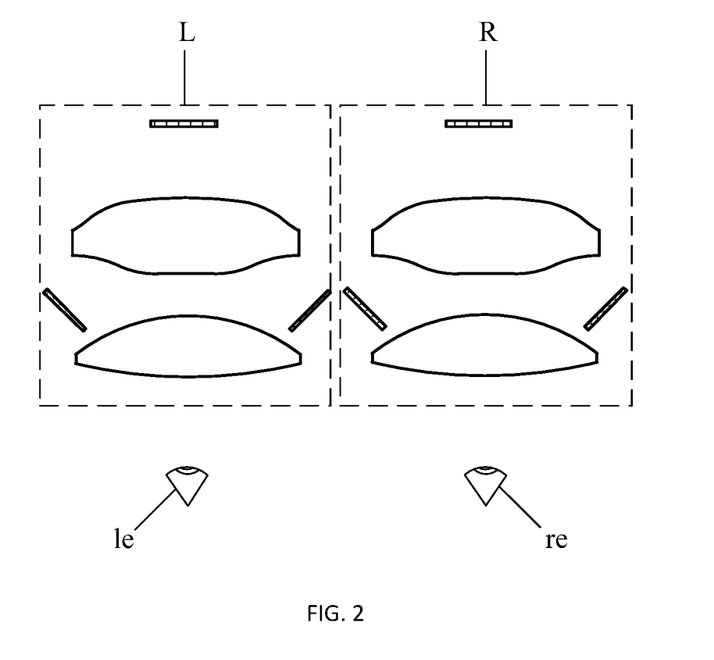
FIG. 2 is a structural schematic diagram of top view of a near-eye display device according to an embodiment of the present disclosure.

FIG. 2 is a structural schematic diagram of top view of a near-eye display device according to an embodiment of the present disclosure.

As shown in FIG. 2, if the structure shown in FIG. 1 is called an optical system, then in specific implementation, an optical system may be set for each eye, where the left eye le corresponds to the left eye optical system L, the right eye re corresponds to the right eye optical system R, and the left eye optical system L and the right eye optical system R can be symmetrically set. When there is a certain parallax between the left eye display image and the right eye display image, the left eye display image and the right eye display image can be fused into a stereoscopic image in the brain.

During specific implementation, the second display screen 12 and the third display screen 13 may be arranged symmetrically with respect to the first display screen 11. This is more in line with rules of human eyes watching things. The first display screen is configured to display the image directly in front of the human eye, and the second display screen 12 and the third display screen 13 are configured to display the image of edge area in the field of view of the human eye. The symmetrical arrangement of the second display screen 12 and the third display screen 13 is beneficial to simplify the design of the imaging lens group.

In some embodiments, the second display screen 12 and the third display screen 13 can be arranged symmetrically with respect to the first display screen 11 along a horizontal direction of a field of view of a human eye. Referring to FIG. 2 of a structural schematic diagram of top view of a near-eye display device, for each eye, the first display screen 11 can be arranged directly in front of the eye, and the second display screen 12 and the third display screen 13 can be arranged on left and right sides of the first display screen, expanding the image field of view of the human eye in the horizontal direction.

In some embodiments, the second display screen 12 and the third display screen 13 can be arranged symmetrically with respect to the first display screen 11 along a vertical direction of a field of view of a human eye. For each eye, the first display screen 11 can be arranged directly in front of the eye. The second display screen 12 and the third display screen 13 are arranged at upper and lower sides of the first display screen, expanding the image field of view of the human eye in the vertical direction.

When the near-eye display device structure as shown in FIG. 2 is adopted, since the second display screen 12 and the third display screen 13 need to be arranged on the left and right sides of the first display screen 11 for the single eye, the expanding width in the horizontal direction is relatively large, and the inner space of both eyes is relatively small, which may cause structural interference between the display screen on the right side of the left eye and the display screen on the left side of the right eye, affecting the viewing angle and the adjustment range of the pupil distance.

In view of the above problems, when designing the optical systems of the near-eye display device in an embodiment of the present disclosure, inward viewing angles of both eyes can be appropriately reduced, that is, the viewing angle on the right side of the left eye and the viewing angle on the left side of the right eye can be adapted to be reduced. This allows a certain distance between two display screens on insides of the eyes. In addition, when designing the optical systems, placement angles of the second display screen 12 and the third display screen 13 can also be adjusted, so that included angles of the second display screen and the third display screen relative to the horizontal direction of human eyes are increased, reducing the space the second display screen and the third display screen occupy in the horizontal direction.

In an embodiment of the present disclosure, shapes and sizes of the first display screen 11, the second display screen 12 and the third display screen 13 are identical. For example, each of the first display screen, the second display screen and the third display screen adopts a rectangular display screen, and an aspect ratio of the rectangular display screen is as close as possible to 3:1, so that the aspect ratio of the overall displayed image can be close to 1:1 after the first display screen 11, the second display screen 12 and the third display screen 13 are arranged sequentially along a width direction of the rectangular display screen.

For example, if each of the first display screen 11, the second display screen 12, and the third display screen 13 adopts a display screen with an aspect ratio of 24:9, then the aspect ratio after splicing of the three display screens is 24:27, close to the aspect ratio of 1:1, in line with the range of field of view of the human eye. If the display resolution of each display screen is 3240×1080, the eye-catching resolution after display splicing is about 3240×3240.

The things directly in front of the human eye are generally clearer than the things at the edge. In order to meet the characteristics and rules of the human eye viewing things, an embodiment of the present disclosure can set an image resolution of the first display screen 11 located in front of the human eye to be greater than image resolutions of the second display screen 12 and the third display screen 13 located on both sides of the first display screen 11.

In some embodiments, physical resolutions of the first display screen 11, the second display screen 12, and the third display screen 13 can be identical, but only some pixels of the second display screen 12 and the third display screen 13 can be controlled to display images, so that the image resolution of the first display screen 11 is higher than the image resolutions of the second display screen 12 and the third display screen 13.

In some embodiments, the physical resolution of the first display screen 11 can be higher than the physical resolution of the second display screen 12 and the third display screen 13, so that when using the above three display screens for image display, it can also achieve an effect that the image resolution of the first display screen 11 is higher than the image resolutions of the second display screen 12 and the third display screen 13.

In addition, according to rules of the human eye viewing real things, the image resolutions of the three display screens can be controlled to be high, and edge image resolutions of the three display screens are low, so that the overall display effect transitions smoothly, which is not limited here.

Figure 3:
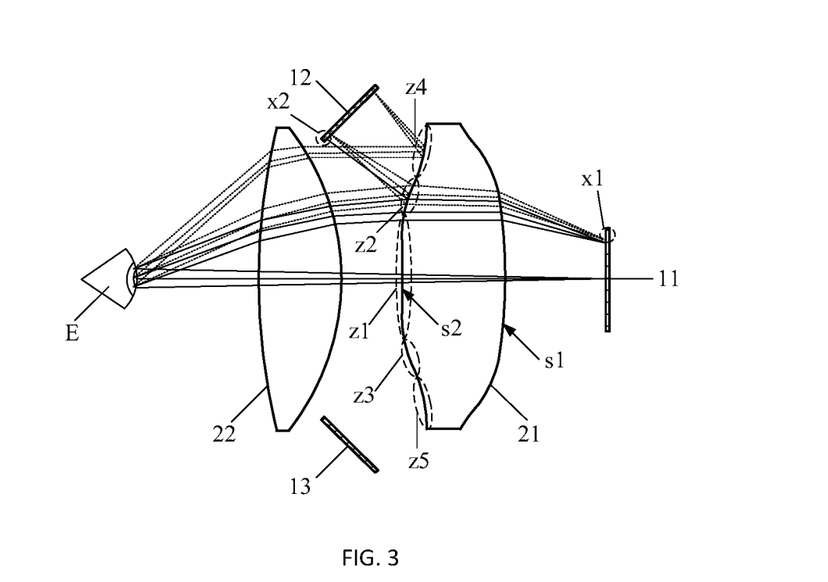
FIG. 3 is a second structural schematic diagram of a near-eye display device according to an embodiment of the present disclosure.

FIG. 3 is a second structural schematic diagram of a near-eye display device according to an embodiment of the present disclosure.

As shown in FIG. 3, the second surface s2 of the first lens includes: a first area z1 located in the middle, a second area z2 and a third area z3 respectively located on both sides of the first area, a fourth area z4 on a side of the second area z2 away from the first area z1, and a fifth area z5 on a side of the third area z3 away from the first area z1.

Here, the second display screen 12 is arranged facing the second area z2 and the fourth area z4, and the third display screen 13 is arranged facing the third area z3 and the fifth area z5. The first area z1 is configured to transmit the outgoing light of the first display screen 11; the second area z2 is configured to transmit the outgoing light of the first display screen 11 and reflect the outgoing light of the second display screen 12; the fourth area z4 is configured to reflect the outgoing light of the second display screen 12; the third area z3 is configured to transmit the outgoing light of the first display screen 11 and reflect the outgoing light of the third display screen 13; the fifth area z5 is configured to reflect the outgoing light of the third display screen 13.

The first surface s1 of the first lens 21 is a completely light-transmitting surface, the first area z1 of the second surface s2 of the first lens 21 is a completely light-transmitting surface, and the second area z2 to the fifth area z5 need to be set according to the optical path as a surface that is partially reflective and partially transmissive. The outgoing light of the first display screen 11 passes through the first surface s1 and the second surface s2 of the first lens, and two surfaces of the second lens in order to reach the human eye E; the outgoing light of the second display screen 12 is first incident on the second surface s2 of the first lens, and after being reflected by the second surface, passes through the two surfaces of the second lens to reach the human eye E; the outgoing light of the third display screen 13 is first incident on the second surface s2 of the first lens, and after being reflected by the second surface, passes through the two surfaces of the second lens to reach the human eye E.

The light paths for the second display screen 12 and the third display screen 13 may be arranged symmetrically, so the surface shape of the first lens may also be arranged as a symmetrical structure.

In an embodiment of the present disclosure, surface shapes of two surfaces of each of the first lens 21 and the second lens may both adopt free-form surfaces. Moreover, the surface shape of the first lens has an axisymmetric structure with respect to a position of an optical axis along a horizontal direction of a field of view of a human eye, and has an axisymmetric structure with respect to a position of an optical axis along a vertical direction of the visual field of the human eye. In actual processing, in order to enable the two lenses to be integrally processed and formed, the two surfaces of the lens are respectively perfectly machinable surfaces, and it is easier to achieve relatively specific functions by using free-form surfaces. Different from traditional spheres, aspherics, Fresnel lenses, etc., which take the center of the optical axis as the axis of rotational symmetry, the free-form surfaces used in the first lens and the second lens in embodiments of the present disclosure are respectively axisymmetric with respect to the horizontal direction and the vertical direction, so that the design of the lens can be simplified and the processing is more convenient.

The free-form surface types of the first lens and the second lens can be in various forms such as xy polynomial, zernike polynomial, Q-type, etc. according to design and processing requirements, which are not limited here. Compared with grinding and mechanical processing and other processes, in order to achieve mass production, the first lens and the second lens in an embodiment of the present disclosure can be processed using molds, which is more conducive to debugging complex surface shapes during production and processing, so that it is more cost-effective to use injection molding process to process free-form lens within the design specifications.

In an embodiment of the present disclosure, the second area z2 and the third area z3 in the second surface s2 of the first lens are partially reflective and partially transmissive areas, which can be set as semi-transparent and semi-reflective areas, and are configured to transmit outgoing light from the first display screen 11, reflect the light from the second display screen 12 and the third display screen 13 at the same time. The role of the fourth area z4 and the fifth area z5 is to reflect the light from the second display screen 12 and the third display screen 13 respectively, so the fourth area z4 and the fifth area z5 can be set as partially reflective and partially transmissive areas, and the reflectance thereof is greater than transmissivity thereof. In some embodiments, the fourth area z4 and the fifth area z5 can also be set as total reflective areas, thereby improving light efficiency.

FIG. 3 only shows part of imaging optical paths of the first display screen 11 and the second display screen 12, and the imaging optical path of the third display screen 13 is set symmetrically with the imaging optical path of the second display screen 12. An embodiment of the present disclosure will be described in detail taking part of imaging optical paths of the first display screen 11 and the second display screen 12 as an example.

Figure 4:
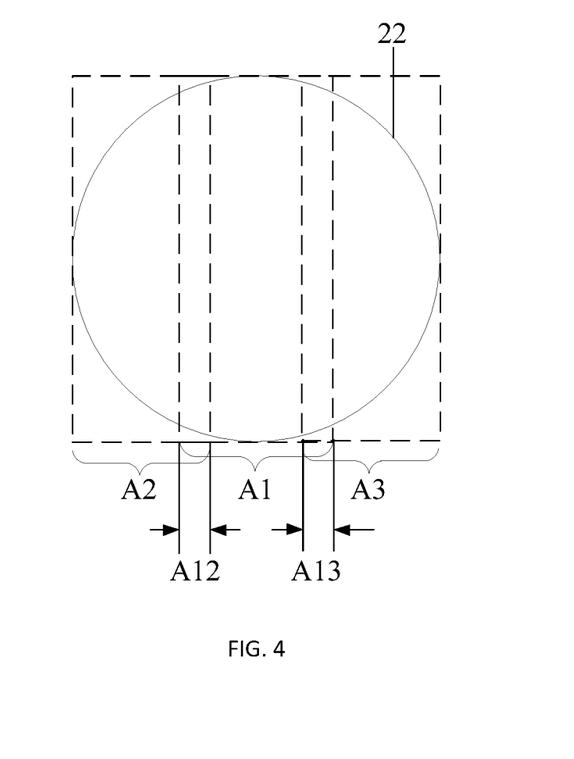
FIG. 4 is a schematic diagram of a field of view of a near-eye display device according to an embodiment of the present disclosure.

FIG. 4 is a schematic diagram of a field of view of a near-eye display device according to an embodiment of the present disclosure.

As shown in FIG. 3 and FIG. 4, in an embodiment of the present disclosure, a second area z2 and a third area z3 are set in the second surface s2 of the first lens. These areas can transmit the outgoing light of the first display screen 11, and can reflect the outgoing light of the second display screen 12 and the third display screen 13, so that when the human eyes are watching, a part of an image overlapping area A12 is generated from a display area A1 of the first display screen and a display area A2 of the second display screen, and a part of an image overlapping area A13 is generated from the display area A1 of the first display screen and a display area A3 of the third display screen.

The reason for setting the above image overlapping area is that the pupil of the human eye is a circular area with a certain size, rather than an ideal point. Therefore, according to the principle of optical path reversal, light from adjacent and closer fields of view originating from the pupil has a certain overlapping area when reaching the surface of the lens, and the light passes through the overlapping area when it advances, and then the light reaching two display screens (such as the first display screen and the second display screen, or the first display screen and the third display screen) after beam splitting is not complete, and there is a phenomenon of brightness reduction.

In addition, due to differences caused by various factors such as pupil distance, pupil size, exit pupil distance, etc., the pupil cannot always be at the position designed for the near-eye display device, that is, there is a problem of the best viewing range (eyebox), which may change the position of the actual light relative to the original propagation path, so the above-mentioned overlapping area needs to be set accordingly to cover this difference.

Taking FIG. 3 as an example, when the human eye E looks straight ahead, most of the light of the image at a splicing position of the first display screen 11 and the second display screen 12 viewed by the human eye comes from the first display screen 11, and a small part of the light comes from the second display screen 12 (as shown by the solid line in FIG. 3), and this part of the light from the first display screen 11 and the second display screen 12 both pass through the second area z2 and then enter the human eye. However, when the human eye's gaze rotates towards a side of the second display screen, the most of the light of the image at the splicing position of the first display screen 11 and the second display screen 12 viewed by the human eye comes from the second display screen 12, a small part of the light comes from the first display screen 11 (as shown by the dotted line in FIG. 3), and this part of light from the first display screen 11 and the second display screen 12 both pass through the second area z2 and then enter the human eye. The first display screen 11 and the second display screen 12 display the same content at the splicing position so that continuous images can be watched without seams as the human eye's gaze rotates.

For the above-mentioned image overlapping area, it can be set that display content of the first display screen 11 incident on a display area corresponding to the second area z2 is identical with display content of the second display screen 12 incident on the display area corresponding to the second area z2, and display content of the first display screen 11 incident on a display area corresponding to the third area z3 is identical with display content of the third display screen 13 incident on the display area corresponding to the third area z3. That is, the first display screen 11 and the second display screen 12, and the first display screen 11 and the third display screen 13 display the same content in a certain area of the splicing position, this part of the image enters the human eye after being fused by the imaging lens group.

As for the phenomenon of brightness reduction (vignetting phenomenon) that occurs in the above-mentioned image overlapping areas (A12 and A13), an embodiment of the present disclosure can set display brightness of the first display screen incident on the display area (x1 indicates that the display brightness incident on the display area corresponding to the second area z2) corresponding to the second area and the third area is greater than display brightness of other areas; display brightness of the second display screen incident on the display area x2 corresponding to the second area is set to be greater than display brightness of other areas; display brightness of the third display screen incident on the display area (set symmetrically with respect to x2) corresponding to the third area is greater than display brightness of other areas.

It should be noted, when differentially adjusting the brightness of the edge display area (such as x1 and x2) of the display screen, it is necessary to increase the display brightness according to a certain rule for different positions of light vignetting according to the law of vignetting, so that the display brightness is consistent with brightness of other positions seen by human eyes.

As shown in FIG. 4, in practical applications, the lenses in the imaging lens group can be circular, elliptical, or circle-like, ellipse-like, and drop-shaped after cutting to avoid the nose, which is not limited here.

Figure 5:
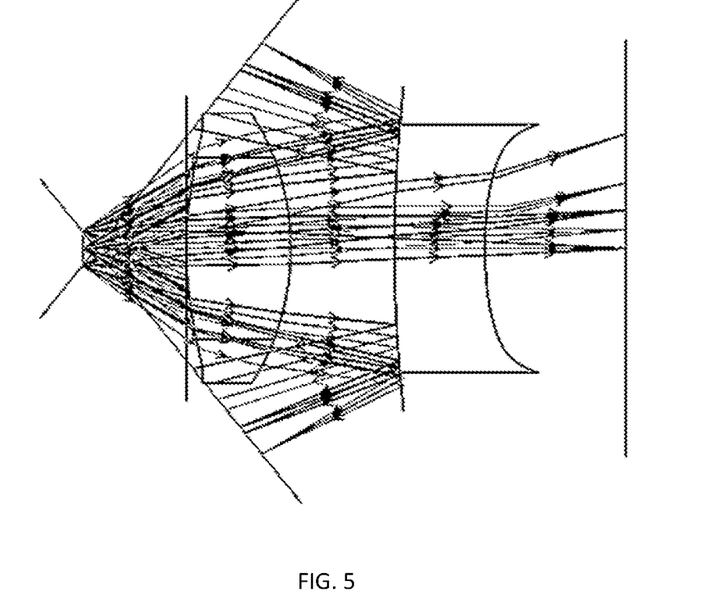
FIG. 5 is a simulation diagram of a near-eye display device according to an embodiment of the present disclosure.

FIG. 5 is a simulation diagram of a near-eye display device according to an embodiment of the present disclosure. As shown in FIG. 5, according to the above-mentioned design principle, an embodiment of the present disclosure can achieve the above-mentioned display effect by using software simulation.

Figure 6:
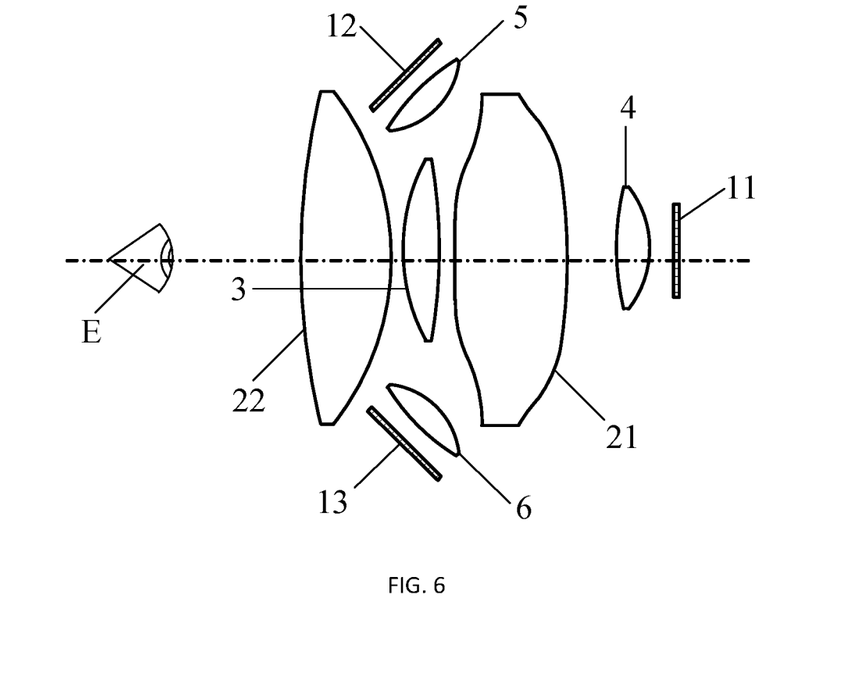
FIG. 6 is a third structural schematic diagram of a near-eye display device according to an embodiment of the present disclosure.

FIG. 6 is a third structural schematic diagram of a near-eye display device according to an embodiment of the present disclosure.

As shown in FIG. 6, in some embodiments, in order to better modulate the light so as to obtain a better display effect, a first lens group 3 can also be arranged between the first lens 21 and the second lens 22, a second lens group 4 can also be arranged between the first display screen 11 and the first lens 21, a third lens group 5 can also be arranged between the second display screen 12 and the first lens 21, and a fourth lens group 6 can also be arranged between the third display screen 13 and the first lens 21.

The first lens group 3, the second lens group 4, the third lens group 5, and the fourth lens group 6 can be set at the same time, or one or more of them can be set according to the imaging quality. Each of the first lens group 3, the second lens group 4, the third lens group 5, and the fourth lens group 6 includes at least one lens, and the lens can adopt a spherical lens, an aspheric lens, a prism or a free-form surface lens, which is not limited here.

It should be noted that the above-mentioned lens (group) must be added under conditions allowed by the lens matching structure, so as to meet the overall optical-mechanical structure, assembly, and debugging.

While embodiments of the present disclosure have been described, additional changes and modifications can be made to these embodiments by those skilled in the art once the basic inventive concept is appreciated. Therefore, it is intended that the appended claims be construed to cover embodiments and all changes and modifications which fall within the scope of the present disclosure.

Apparently, those skilled in the art can make various changes and modifications to embodiments of the present disclosure without departing from the spirit and scope of embodiments of the present disclosure. In this way, if these modifications and variations of embodiments of the present disclosure fall within the scope of the claims of the present disclosure and equivalent technologies thereof, the present disclosure is also intended to include these modifications and variations.

What is claimed is:

1. A near-eye display device, comprising:
   a plurality of display screens for image display; the plurality of display screens at least comprising: a first display screen, a second display screen and a third display screen; and
   an imaging lens group configured to image displayed images of the display screens; the imaging lens group comprising at least: a first lens and a second lens;
   wherein the first lens and the second lens are both on a light-emitting side of the first display screen, and the second lens is on a side of the first lens away from the first display screen; the second display screen and the third display screen are on a side of the first lens away from the first display screen;
   the first lens comprises: a first surface facing the first display screen and a second surface away from the first display screen; the first surface is configured to transmit outgoing light of the first display screen; the second surface is configured to transmit the outgoing light of the first display screen and reflect outgoing light of the second display screen and outgoing light of the third display screen;
   wherein the second surface of the first lens comprises: a first area located in a middle of the second surface, a second area and a third area respectively located on both sides of the first area, a fourth area located on a side of the second area away from the first area, and a fifth area located on a side of the third area away from the first area; the second display screen is arranged facing the second area and the fourth area, and the third display screen is arranged facing the third area and the fifth area;
   wherein the first area is configured to transmit the outgoing light of the first display screen; the second area is configured to transmit the outgoing light of the first display screen and reflect the outgoing light of the second display screen; the fourth area is configured to reflect the outgoing light of the second display screen; the third area is configured to transmit the outgoing light of the first display screen and reflect outgoing light of the third display screen; the fifth area is configured to reflect the outgoing light of the third display screen;
   wherein display content of the first display screen incident on a display area corresponding to the second area is identical with display content of the second display screen incident on the display area corresponding to the second area; display content of the first display screen incident on a display area corresponding to the third area is identical with display content of the third display screen incident on the display area corresponding to the third area.

2. The near-eye display device according to claim 1, wherein the second display screen and the third display screen are arranged symmetrically with respect to the first display screen.

3. The near-eye display device according to claim 2, wherein the second display screen and the third display screen are arranged symmetrically with respect to the first display screen along a horizontal direction of a field of view of a human eye; or the second display screen and the third display screen are arranged symmetrically with respect to the first display screen along a vertical direction of a field of view of a human eye.

4. The near-eye display device according to claim 3, wherein shapes and sizes of the first display screen, the second display screen and the third display screen are identical;
each of the first display screen, the second display screen and the third display screen is a rectangular display screen, and an aspect ratio of the rectangular display screen is 3:1; the first display screen, the second display screen and the third display screen are arranged in sequence along a width direction of the rectangular display screen.

5. The near-eye display device according to claim 2, wherein an image resolution of the first display screen is greater than an image resolution of the second display screen and an image resolution of the third display screen.

6. The near-eye display device according to claim 1, wherein the first display screen, the second display screen and the third display screen are liquid crystal display screens, organic light-emitting diode display screens or silicon-based display screens.

7. The near-eye display device according to claim 1, wherein display brightness of the first display screen incident on the display area corresponding to the second area and the third area is greater than display brightness of other areas;
display brightness of the second display screen incident on the display area corresponding to the second area is greater than display brightness of other areas;
display brightness of the third display screen incident on the display area corresponding to the third area is greater than display brightness of other areas.

8. The near-eye display device according to claim 1, wherein the second area, the third area, the fourth area and the fifth area are all partially reflective and partially transmissive areas;
a reflectance of each of the fourth area and the fifth area is greater than a reflectance of each of the second area and the third area.

9. The near-eye display device according to claim 1, wherein the second area and the third area are partially reflective and partially transmissive areas; the fourth area and the fifth area are reflective areas.

10. The near-eye display device according to claim 1, wherein surface shapes of the first lens and the second lens both adopt free-form surfaces.

11. The near-eye display device according to claim 10, wherein the first lens comprises an axisymmetric structure with respect to a position of an optical axis along a horizontal direction of a field of view of a human eye, and the first lens comprises an axisymmetric structure with respect to a position of an optical axis along a vertical direction of the field of view of the human eye.

12. The near-eye display device according to claim 1, further comprising:
a first lens group located between the first lens and the second lens; and/or
a second lens group located between the first display screen and the first lens; and/or
a third lens group located between the second display screen and the first lens; and/or
a fourth lens group located between the third display screen and the first lens.

13. The near-eye display device according to claim 12, wherein each of the first lens group, the second lens group, the third lens group and the fourth lens group comprises at least one lens;
the lens adopts a spherical lens, an aspheric lens, a prism or a free-form surface lens.

* * * * *